Oct. 12, 1937.　　　A. GIROUARD　　　2,095,547
ORNAMENTAL CHAIN
Filed May 9, 1936

INVENTOR
ALBERT GIROUARD.
BY
ATTORNEY

Patented Oct. 12, 1937

2,095,547

UNITED STATES PATENT OFFICE 2,095,547

ORNAMENTAL CHAIN

Albert Girouard, Leominster, Mass., assignor to Fosgood Corporation, Leominster, Mass., a corporation of Massachusetts Application May 9, 1936, Serial No. 78,824

2 Claims. (Cl. 59—80)

This invention relates to an ornamental chain, having pivotally connected ornamental links, intended for use for articles of personal wear such as hair bandeaus, bracelets, belts, neckbands, as well as for other purposes.

The links of my improved chain each have a coupling block formed as an integral part thereof and are molded of a single piece of suitable resilient thermoplastic material, such as cellulose acetate composition, or like material.

Among the objects of the invention are to provide a chain having links which are simple, inexpensive to manufacture and assemble, and which may be made in any desired ornamental shape.

Other objects of the invention will appear from the following description thereof, reference being had to the accompanying drawing, in which.

Figure 1:
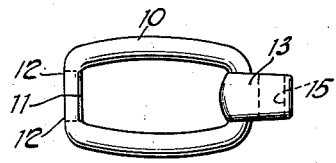
Figure 1 is a top plan view of one of my improved ornamental links.
Figure 2:
Fig. 2 is a side view thereof, partly broken.
Figure 3:
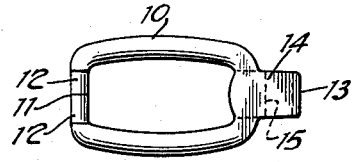
Fig. 3 is a bottom plan view of the link.

Referring to the drawing, 10 indicates a link which may be made in any desired ornamental form and may be molded in one piece of thermoplastic cellulose acetate composition or like resilient material.

One end of the link is split crosswise at 11 to provide two abutting portions or posts 12—12 of circular cross-section. The opposite end has a coupling block 13 formed thereon and integral with the link. The rear face 14 of the block is substantially flush with the rear face of the link so that when the links are pivotally connected, they will form a chain having a smooth rear face, thus providing a chain which is very comfortable to wear.

Figure 4:
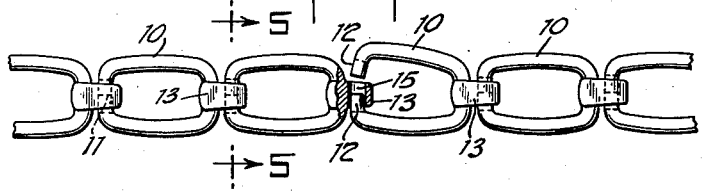
Fig. 4 is a view of a number of links assembled to form a chain, one of the links being partly broken away.
Figure 5:
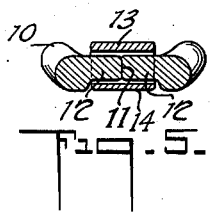
Fig. 5 is a cross-sectional view on the line 5—5 of Fig. 4.
Figure 6:
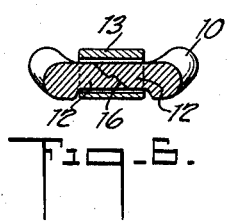
Fig. 6 is a similar sectional view showing a modification.

The coupling block has a transverse hole 15 for receiving the portions 12—12 of an adjacent link so as to pivotally connect the two. In assembling the chain, the split end of one link is sprung apart and engaged in the hole of the coupling block of the adjacent link, as shown in Fig. 4. In this way, the chain may be quickly and easily assembled. The portions of the link pivotally engaged within the coupler may be formed with a butt joint 11 such as shown in Fig. 5, or with a scarf joint 16 having offset faces as shown in Fig. 6.

Various modifications in the details of construction herein illustrated and described may be made without departing from the spirit and scope of the invention.

What I claim is:—

1. In an ornamental chain, a series of resilient spaced links having sides and ends that are spaced to form an open center, one of the ends being split to form a pair of posts, and coupling blocks integral with the opposite ends of the links and having openings at their outer ends to receive the posts, the blocks being of less width than that of the open centers of the links and having their outer ends projecting outwardly from said opposite ends of the links so as to bridge the spaces between adjacent links, the blocks being visible from the front of the chain, the free ends of the posts being formed to provide a scarf joint having offset faces therebetween.

2. In an ornamental chain, a series of resilient spaced links having sides and ends that are spaced to form an open center, one of the ends being split to form a pair of posts, and coupling blocks integral with the opposite ends of the links and having openings at their outer ends to receive the posts, the blocks being of less width than that of the open centers of the links and having their outer ends projecting outwardly from said opposite ends of the links so as to bridge the spaces between adjacent links, the blocks being visible from the front of the chain, the under faces of the blocks being flat and forming substantially continuations of the under faces of the adjacent ends of the links.

ALBERT GIROUARD.